(12) United States Patent
Kobayashi

(10) Patent No.: US 6,418,891 B2
(45) Date of Patent: Jul. 16, 2002

(54) INTERNAL COMBUSTION ENGINE

(75) Inventor: Takeshi Kobayashi, Yokohama (JP)

(73) Assignee: Walbro Japan, Inc., Tokyo (JP)

( * ) Notice: Subject to any disclaimer, the term of this patent is extended or adjusted under 35 U.S.C. 154(b) by 0 days.

(21) Appl. No.: 09/802,145

(22) Filed: Mar. 8, 2001

(30) Foreign Application Priority Data

Mar. 13, 2000 (JP) .......... 2000-069271
May 10, 2000 (JP) .......... 2000-137441
May 11, 2000 (JP) .......... 2000-138376

(51) Int. Cl.[7] ............................... F02M 25/08
(52) U.S. Cl. .................. 123/73 PP; 123/73 B
(58) Field of Search .............. 123/73 PP, 73 B, 123/73 A, 73 BA

(56) References Cited

U.S. PATENT DOCUMENTS 6,257,179 B1 * 7/2001 Uenoyama et al. ....... 123/65 R
6,267,088 B1 * 7/2001 Rosskamp et al. ....... 123/73 PP
6,298,811 B1 * 10/2001 Sawada et al. ........... 123/73 A

* cited by examiner

Primary Examiner—Marguerite McMahon
(74) Attorney, Agent, or Firm—Reising, Ethington, Barnes, Kisselle, Learman & McCulloch, PC

(57) ABSTRACT

A two-stroke internal combustion engine having an air control arrangement which controls scavenging air flow during rapid engine acceleration to optimize the acceleration and maximum power output of the engine while maintaining low exhaust emissions from the engine. Desirably, the air control arrangement may comprise a valve that throttles the air passage to one half or less of its total flow area at a medium engine load or less and completely or fully opens at a medium engine load or more of the engine. Normally, the air control valve opens in unison with the throttle valve, but during rapid acceleration of the engine the air control valve opens later or more slowly than the throttle valve to control the supply of scavenging air to the combustion chamber of the engine thereby enhancing rapid acceleration of the engine.

20 Claims, 4 Drawing Sheets

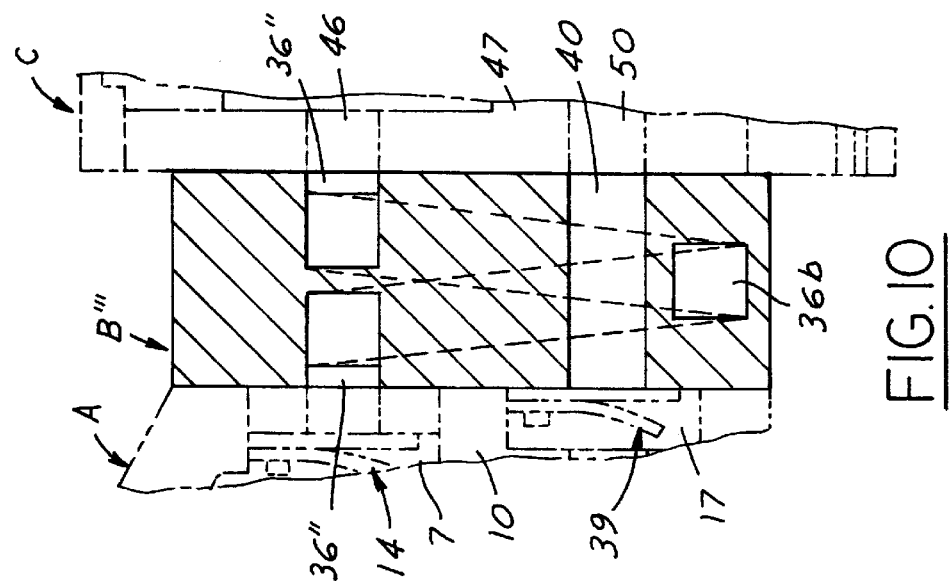
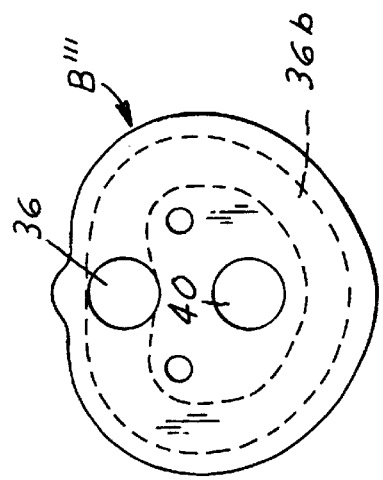
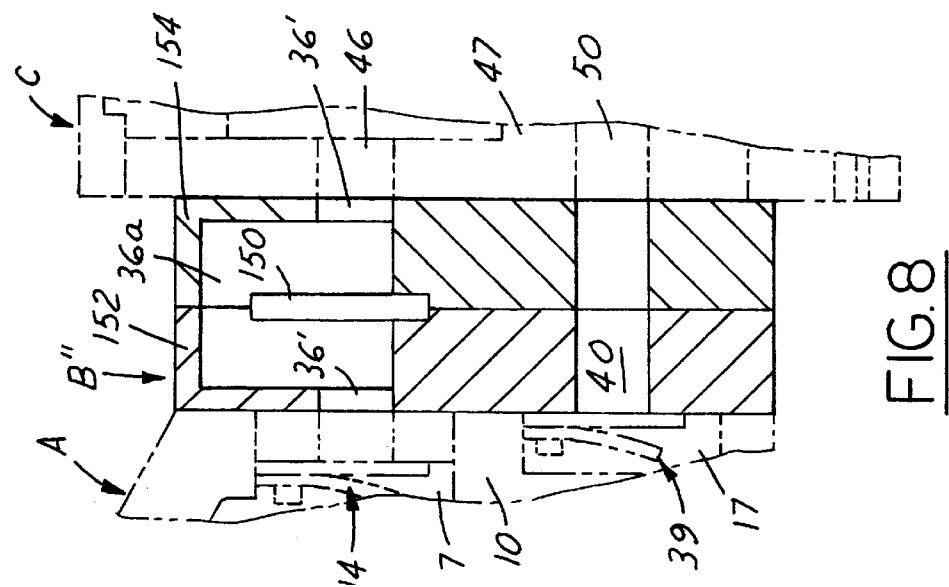

INTERNAL COMBUSTION ENGINE

REFERENCE TO RELATED APPLICATIONS

Applicant claims priority of Japanese patent applications, Ser. No. 2000-069271, filed Mar. 13, 2000; Ser. No. 2000-137441, filed May 10, 2000; and 2000-138376, filed May 11, 2000.

FIELD OF THE INVENTION

This invention relates generally to internal combustion engines and more particularly to a stratified scavenging two-stroke internal combustion engine.

BACKGROUND OF THE INVENTION

Generally, in a so-called stratified scavenging two stroke internal combustion engine a scavenging air supply is introduced into a combustion chamber of the engine after a combustion event has occurred and before a fuel and air mixture is delivered from a crankcase chamber of the engine to facilitate exhausting the combusted gas from the combustion chamber and to provide some air to facilitate combustion of a subsequently delivered fuel and air mixture. During rapid acceleration of the engine, the scavenging air enters the combustion chamber at a high flow rate which tends to dilute the fuel and air mixture making it overly lean and thereby materially deteriorating the acceleration, performance and stability of the engine.

When the scavenging air supply is limited or throttled during rapid acceleration of the engine, the stability of the acceleration of the engine is improved because dilution of the fuel and air mixture is prevented but the maximum power output of the engine is significantly reduced. If the fuel mixture passage is widened or enlarged, the requirements for acceleration and maximum power output can be satisfied, but there is an increased and unacceptably high level of exhaust emissions from the engine.

SUMMARY OF THE INVENTION

A two-stroke internal combustion engine having an air control which controls scavenging air flow during rapid engine acceleration to optimize the acceleration and maximum power output of the engine while maintaining low exhaust emissions from the engine. Desirably, the air control may comprise a valve that throttles the air passage to one half or less of its total flow area at a medium engine load or less and completely or fully opens at a medium engine load or more of the engine. Normally, the air control valve opens in unison with the throttle valve, but during rapid acceleration of the engine the air control valve opens later or more slowly than the throttle valve to control the supply of scavenging air to the combustion chamber of the engine thereby enhancing rapid acceleration of the engine. The air control valve eventually fully opens to increase the maximum power output of the engine and the fuel mixture passage need not be widened to avoid excessive exhaust emissions.

In one form, the air control may be a butterfly or disk type valve driven for rotation by the rotation of the throttle valve through a linkage. In another form, the air control may be a plunger type valve biased by a spring to delay its opening upon rapid acceleration of the engine. In yet another form, the air control may comprise a read type valve. In yet another form, the air control comprises an air passage between the carburetor and engine which is longer than the fuel and air mixture passage so that upon rapid engine acceleration, which tends to draw increased air into the combustion chamber, the scavenging air has a longer path to travel than the fuel and air mixture. Hence, less air is drawn into the engine during rapid acceleration to prevent undue dilution of the fuel mixture in the combustion chamber and enable smooth, stable acceleration. In any form, the flow of air to the combustion chamber during rapid acceleration of the engine is controlled to limit the air flow into the combustion chamber and thereby provide a desired fuel and air mixture suitable to enable rapid acceleration without loss of power output from the engine and without increasing the exhaust emissions of the engine.

Objects, features and advantages of this invention include providing an engine which provides a scavenging air supply to the engine, controls the flow rate of scavenging air at least during rapid engine acceleration, enables smooth, stable and rapid engine acceleration, permits a high maximum engine power output, has relatively low exhaust emissions, improves the responsiveness of the engine, is of relatively simple design economical manufacture and assembly, and in service has a long and useful life.

BRIEF DESCRIPTION OF THE DRAWINGS

These and other objects, features and advantages of this invention will be apparent from the following detailed description of the preferred embodiments and best mode, appended claims and accompanying drawings in which:

FIG. 8 is a front sectional view of a stratified scavenging two-stroke internal combustion engine according to a fifth embodiment of the invention;

FIG. 9 is a side sectional view of a portion of the engine of FIG. 8;

FIG. 10 is a front sectional view of a stratified scavenging two-stroke internal combustion engine according to a fifth embodiment of the present invention;

FIG. 11 is a side view of an insulator plate of the engine of FIG. 10.

DETAILED DESCRIPTION OF THE PREFERRED EMBODIMENTS

Figure 1:
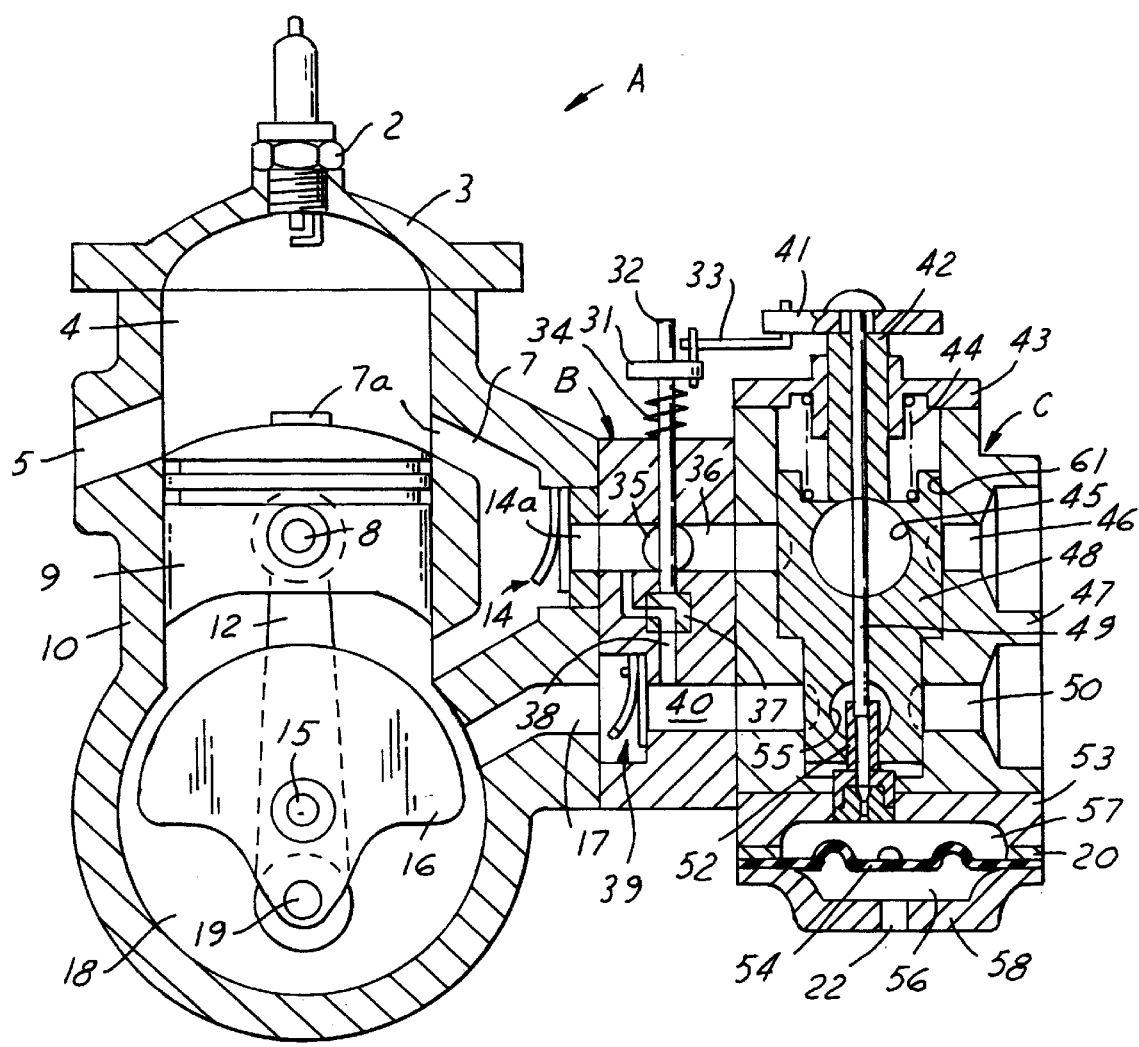
FIG. 1 is a front sectional view of a stratified scavenging two-stroke engine according to the present invention.

Referring in more detail to the drawings, FIG. 1 illustrates a two-stroke internal combustion engine A according to the present invention, having a carburetor C connected through a heat insulator plate B to the engine. In the engine A, a piston 9 is inserted into a cylinder body 10 to define a combustion chamber 4 closed by a cylinder head 3 above the piston 9 and a crankcase chamber 18 below the piston 9. An upper end of a connecting rod 12 is connected to the piston 9 by a pin 8, and a lower end of the connecting rod 12 is connected to a crank arm integral with a balance weight 16a and crank shaft 15 by a pin 19. In the illustrated embodiment, three scavenging passages 7 are provided in a right side wall and front and rear walls, respectively, of the cylinder body 10, and an exhaust port 5 is provided in a left side wall of the cylinder 10. A scavenging port 7a of each scavenging passage 7 and the exhaust port 5 are communicated with the combustion chamber 4 at a bottom dead center position of the piston 9.

In the carburetor C, a cylindrical, stepped throttle valve 48 is rotatably and vertically movably inserted into a stepped bore 61 perpendicular to an air passage 46 and a fuel mixture passage 50 extending through a carburetor body 47. The stepped throttle valve 48 is provided with an air valve having a throttle hole 45 capable of being communicated with the air passage 46 and a mixture valve having a throttle hole 55 capable of being communicated with the mixture passage 50. A fuel nozzle 52 extends into the bore 61 and projects into the throttle hole 55. A needle 49 carried by the throttle valve 48 is inserted into the fuel nozzle 52 to adjust to the flow area of a fuel jet or opening of the fuel nozzle 52. The lower end of the fuel nozzle 52 is communicated with a metering chamber 57 via a check valve (not shown) and the fuel jet. A cover 58 is connected to an intermediate plate 53 connected to the lower end of the carburetor body 47. A diaphragm 54 and gasket 20 are disposed between the cover 58 and plate 53. A metering chamber 57 and an atmospheric chamber 56 open to the atmosphere through a vent 22 are defined at least in part above and below, respectively, the diaphragm 54.

A valve shaft 42 of the throttle valve 48 extends through a cover plate 43 which is connected to the upper end of the carburetor body 47 to close the stepped bore 61. A throttle valve lever 41 is connected to the upper end of the valve shaft 42. A cam surface (not shown) is formed on the lower surface of the throttle valve lever 41 and is engaged to a follower (not shown) upwardly projecting from the cover plate 43 by the force of a return spring 44. The return spring 44 is disposed so as to surround the valve shaft 42 between the cover plate 43 and the throttle valve 48, and the upper and lower ends of the return spring 44 are fastened at the cover plate 43 and the throttle valve 48, respectively. The throttle valve 48 is yieldably biased to an idle position as shown, by the force of the return spring 44.

The carburetor has a diaphragm type fuel pump, not shown, driven by pressure pulses of the crankcase chamber 18 of the engine to draw fuel from a fuel tank and supply it to the metering chamber 57. Fuel is stored in the metering chamber 57 under substantially constant pressure maintained by an inlet valve, which is opened and closed in response to movement of the diaphragm 54.

According to the present invention, a heat insulator plate B is disposed between the cylinder body 10 and the carburetor C. The insulator plate B has an air passage 36 communicating the air passage 46 of the carburetor C with a scavenging passage 7 and a fuel mixture passage 40 communicating the fuel mixture passage 50, of the carburetor C with an intake part 17 in the engine A through a check valve 39. An air control valve 35 is connected on a valve shaft 32 and is disposed in the air passage 36 for controlling air flow from the air passage 46 to the scavenging passage 7 through a port 14a of the engine having a check valve 14. A lever 31 is connected to the upper end of the valve shaft 32, and a return spring 34 is disposed between the lever 31 and the upper wall of the heat insulator plate B. The lever 31 and the throttle valve 41 are connected by a linkage 33. A second valve 37 is connected to the lower end of the valve shaft 32. The second valve 37 is designed to open and close a passage 38 connecting a portion of the air passage 36 downstream of the air control valve 35 and the mixture passage 40 in the insulator plate B.

The air control valve 35 carried by the heat insulator plate B has a minimum opening area which is about ½ of the normal or fully open area of the air passage 36 and need not be fully closed at any time. The lever 31 on the valve shaft 32 of the air control valve 35 and the throttle valve lever 41 are connected by a linkage 33 such that the air control valve 35 opens more slowly or later by a phase difference than the throttle valve 48. Since the air control valve 35 may have a smaller working angle of rotation than the throttle valve 48, the air control valve 35 is connected so that it is rarely operated or moved below a medium engine load or a medium opening position of the throttle valve 48 (i.e. when the throttle valve 48 is mid-way between its idle and wide open positions). The air control valve 35 is preferably fully opened when the throttle valve 48 is in the vicinity of its wide-open position.

At idle and low speed and low load engine operation the second valve 37 is open to communicate the mixture passage 40 and the air passage 36 through passage 38. At high speed and or high load engine operation the second valve 37 is closed. When the passage 38 is opened during low speed engine operation, a part of the fuel and air mixture is supplied to the air passage 36 and fuel which stays in the air passage 36 assists acceleration in case the engine is rapidly accelerated. However, during high-speed or high load engine operation, corresponding to wide open throttle valve 48 position, the passage 38 is closed to avoid increasing the emission of harmful components of exhaust gases.

During the operation of the engine, when the piston 9 moves toward top dead center the pressure in the crankcase chamber 18 decreases, thereby drawing a fuel and air mixture from the carburetor C through the mixture passage 40, the check valve 39 and the intake port 17 and into the crankcase chamber 18. Air flows into the crankcase chamber 18 through the air passages 46 and 36, the check valve 14 and the scavenging passage 7. That is, a condition exists wherein the scavenging passage 7 is filled with air and the fuel and air mixture in the crankcase chamber 18 is made lean by air.

When a fuel and air mixture in the combustion chamber 4 is ignited by a spark plug 2, the pressure in the combustion chamber 4 rapidly increases, and as the piston 9 moves down toward bottom dead center, the pressure in the crankcase chamber 18 increases. When the piston 9 moves down to a given position the exhaust port 5 opens so that the combustion gas in the combustion chamber 4 may flow out of the exhaust port 5 and the pressure in the combustion chamber 4 rapidly decreases. At the same time, the scavenging ports 7a of the scavenging passages 7 open so that first air in the scavenging passage 7 flows into the combustion chamber 4 and then the fuel and air mixture in the crankcase chamber 18 flows into the combustion chamber 4 via the scavenging passage 7.

Figure 3:
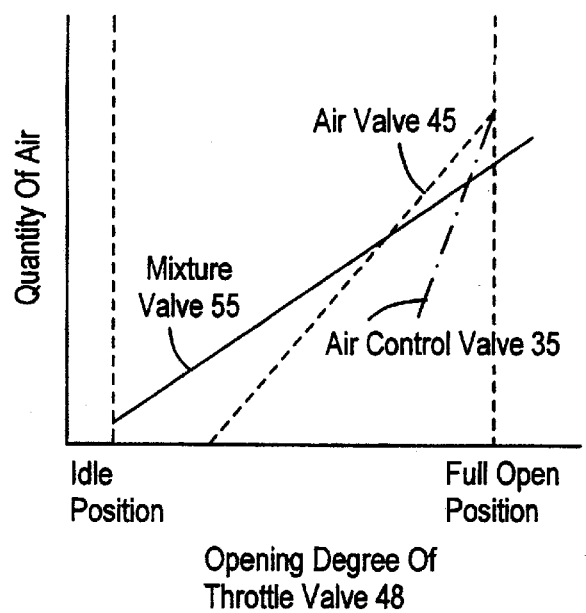
FIG. 3 is a diagram illustrating the relationship between a throttle valve and air valve of the carburetor and an air control valve in the engine.

FIG. 3 shows how the quantity of air changes relative to the operating position of the fuel mixture valve (represented by throttle hole 55) in response to the throttle valve 48, the air valve (represented by throttle hole 45) and the air control valve 35. The air control valve 35 relatively rapidly opens when the fuel mixture valve moves toward its fully or wide-open position. There is a time or phase difference in operation or movement of the air control valve 35 from the idle or low speed position and the full open or high speed position when the engine is rapidly accelerated. During rapid acceleration, the engine speed or R.P.M. rapidly increases and the fuel mixture valve (throttle hole 55) is fully opened before the air control valve 35 is fully opened so that a rich fuel and air mixture (a mixture not made lean by air from the scavenging passage 7) is supplied from the crankcase chamber 18 to the combustion chamber 4 to assist the acceleration and the increase in the engine R.P.M. In other words, the delay in fully opening the air control valve 35 after the fuel mixture valve is fully opened throttles or limits the flow of air through the air passage 36. This reduces the amount of air mixed with the fuel and air mixture transferred from the crankcase chamber 18 to the combustion chamber 4 providing a rich fuel and air mixture in the combustion chamber to support the rapid engine acceleration. The delay in fully opening the air control valve 35 is sufficient to support rapid acceleration even if the valve 35 relatively quickly opens after initial rapid acceleration because the delay permits the engine speed to rapidly increase to a desired and sufficiently high speed.

Figure 2:
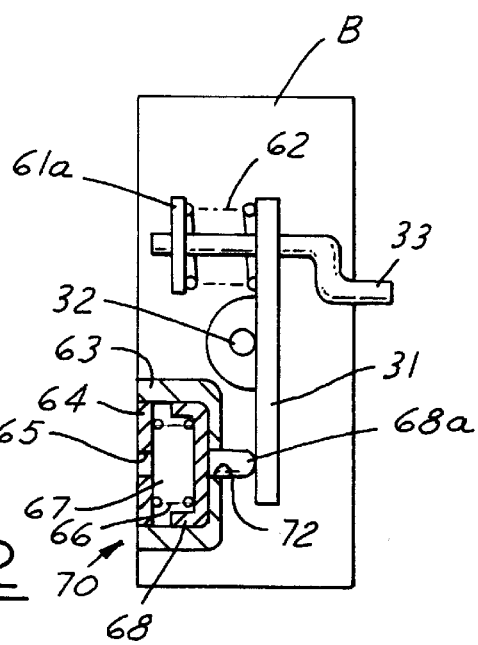
FIG. 2 is a plan view of an insulator plate of a stratified scavenging two-stroke engine according to a second embodiment of the present invention.

In the embodiment shown in FIG. 2, to improve the acceleration of the engine by delaying the full opening of the air control valve 35 relative to the throttle valve 48 when the engine is rapidly accelerated, an air damper 70 is provided on the upper wall of the heat insulator B. In the air damper 70, a piston 68 is fitted in a cylinder 63 having a hole 72, and a rod 68a projecting from the piston 68 extends out of the hole 72 and into contact with the lever 31 connected to the valve shaft 32 by the force of a spring 66 disposed between a wall plate 64 and the piston 68. The linkage 33 extends through and is supported on the lever 31 and a spring 62 is disposed between the lever 31 and a spring seat 61a connected to the end of the link 33. Wall plate 64 has an opening or throttle hole 65 and defines in part a chamber 67. In the present embodiment, the passage 38 and the second valve 37 are not provided.

Figure 4:
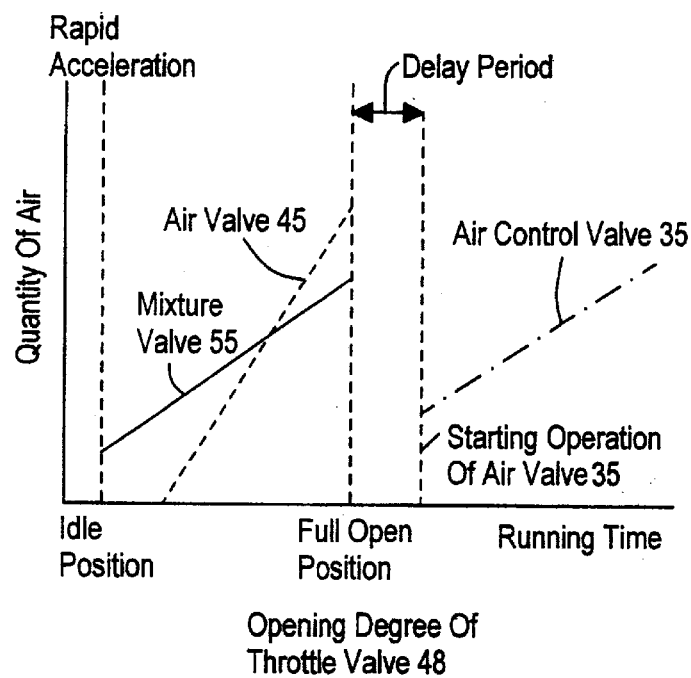
FIG. 4 is a diagram illustrating the relationship between a throttle valve and air valve of the carburetor and an air control valve in the engine.

Even if the throttle valve lever 41 is rapidly turned to rapidly move the throttle valve 48 toward its fully open position when the engine is rapidly accelerated, the spring 62 is compressed so that the lever 31 turns later or more slowly than the throttle valve 48 due to the action of the air damper 70. As the lever 31 rotates, the piston 68 is displaced by the lever 31 against the force of the spring 66 and gradually moves leftward (as viewed in FIG. 2), and the air control valve 35 moves to its fully open position after the throttle valve 48 of the carburetor C, by a delay period, has been fully opened as shown in FIG. 4.

Second Embodiment

Figure 6:
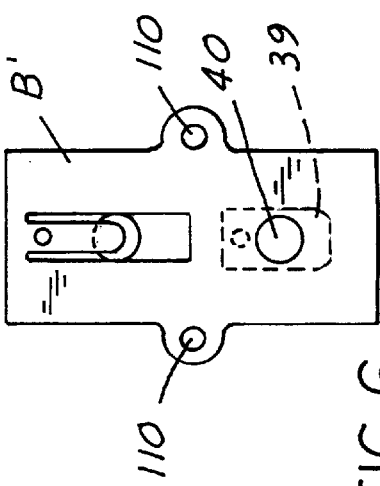
FIG. 6 is a side sectional view of a portion of the engine of FIG. 5.
Figure 5:
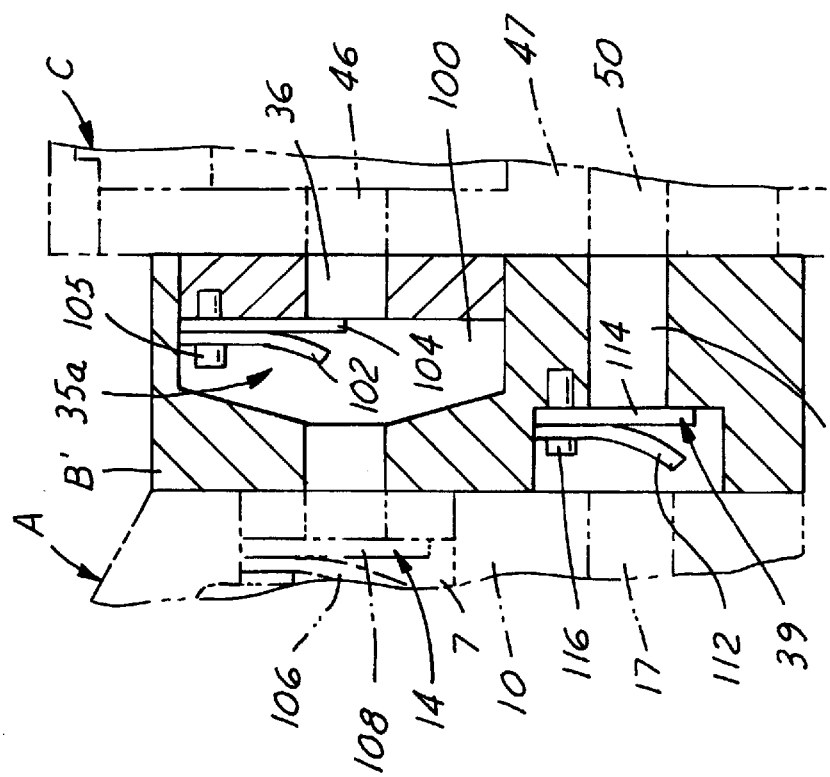
FIG. 5 is a front sectional view of a stratified scavenging two-stroke internal combustion engine according to a third embodiment of the invention.

As shown in FIGS. 5 and 6, in accordance with a second embodiment of an engine of the present invention, for improving the responsiveness of the engine during rapid acceleration without sacrificing the maximum power output of the engine, an air control valve 35a is disposed in the air passage 36 of the insulator plate B' between the air valve 45 (not shown) and the check valve (shown as a reed valve) 14 provided at an inlet of the scavenging passage 7. To facilitate the description of this embodiment, essentially only the insulator plate B' and associated components are shown. The engine A, carburetor C and their associated components may be the same as shown in FIG. 1 and described with reference thereto. A valve chamber 100 having a rectangular shape in section is provided in the air passage 36 of the heat insulator plate B'. In this embodiment the air control valve 35a is a reed valve disposed in part in communication with the air passage 36. A partially curved or bent guide plate 102 and valve plate 104 are superimposed on each other and fixed to the side wall of the valve chamber 30 by means of a rivet 105 or other fastener. The reed valve 35a partially closes the air passage 36 when in its unflexed state shown in FIG. 5 and is flexed to a position permitting an essentially free flow of air through the air passage 36 by a sufficiently high vacuum signal acting thereon. In other words, when flexed, the valve plate 104 bears on the bent portion of the guide plate 102 and permits an increased airflow through the air passage 36 compared to its unflexed state.

The check valve 14 is provided in a valve chamber in the sidewall of the cylinder body 10. A partially curved or bent guide plate 106 and a check valve plate 108 are superimposed on each other and fixed to the side wall of the valve chamber by means of a rivet or other fastener. The check valve 14 is flexible, has low rigidity, and rapidly opens the air passage 36 when the scavenging passage 7 assumes vacuum pressure.

As shown in FIG. 6, the heat insulator plate B' is secured to the side wall of the cylinder body 10 by means of bolts extending through bolt insert holes 110 provided in the front and rear edges. A check valve (reed valve) 39 disposed at an inlet of intake port 17 is secured to a valve chamber provided on the heat insulator plate B', and a partially curved or bent guide plate 112 (FIG. 5) and a check valve plate 114 are superimposed on each other and secured to a side wall of the valve chamber by means of a rivet 116 or other fastener. The check valve 39 is flexible, has low rigidity and quickly opens the mixture passage 40 when the intake port 17 assumes vacuum pressure.

On the other hand, the air control valve 35a, is less flexible and has a greater rigidity than valves 14 and 39. Accordingly, even if the air valve (throttle hole 45) and the fuel mixture valve (throttle hole 55) are rapidly fully opened during rapid acceleration of the engine, the check valves 14 and 39 are already opened by vacuum pressure in the crankcase chamber 18 so that a fuel and air mixture from the mixture passage 50 rapidly flows to the intake port 17 via the mixture passage 40. However, the air control valve 35a temporarily remains in its unflexed or closed position and throttles the airflow through the air passage 36. When the rotational speed of the engine increases thereby increasing the vacuum pressure in the scavenging passage 7 beyond a threshold pressure, the air control valve 35a is flexed to its open position moving valve plate 104 against the guide plate 102 to permit increased fluid flow through the air passage 36.

As will be apparent from the foregoing, for low speed and low load engine operation, air passage 36 need not be fully closed, and preferably has a restricted flow area controlled by the air control valve 35a which permits low speed operation and sufficient engine acceleration. When the internal combustion engine is rapidly accelerated, even if the throttle valve lever 41 is rapidly turned to fully open throttle valve 48, the air control valve 35a opens later than the check valve 39 due to the greater rigidity of its valve plate 104. Accordingly, the air control valve 35a throttles airflow through the air passage until a relatively high engine speed is obtained to ensure that a rich enough fuel and air mixture is provided to the engine to support its rapid acceleration. When the engine attains a high enough speed or load, the vacuum generated in the crankcase chamber 18 will move the valve 35a to its flexed position permitting greater air flow through the air passage 36 and to the engine to ensure sufficient air is provided for maximum engine power output and to avoid an overly rich fuel mixture and accompanying high exhaust emissions.

Figure 7:
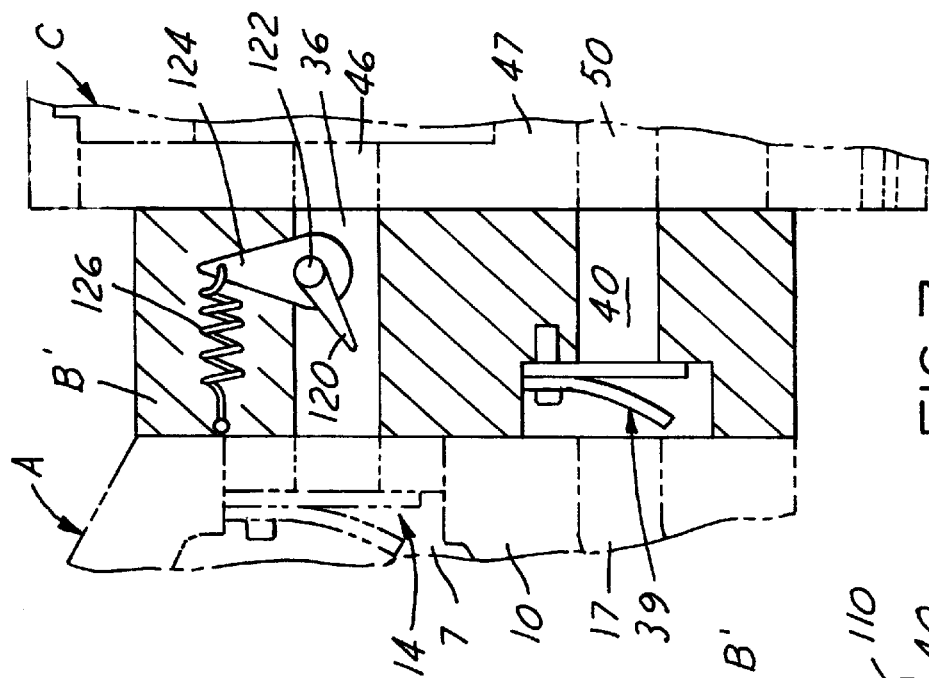
FIG. 7 is a front sectional view of a stratified scavenging two-stroke internal combustion engine according to a fourth embodiment of the present invention.

In the embodiment shown in FIG. 7, a moveable plate 120, in place of the reed valve 35a acts as the air control valve in the air passage 36. The movable plate 120 is supported in the air passage 36 by means of a shaft 122. A lever 124 is connected to the outer end of the shaft 122 for connecting the movable plate 120, and a spring 126 yieldably biases the plate 120 towards its closed position reducing the flow area of the air passage 36. The movable plate 120 provided in the air passage reduces the flow area of the air passage 36 by about ½ of its unrestricted or normal flow area, and need not ever fully close the air passage 36. The movable plate 120 is movable to a second or fully open position permitting a substantial free air flow through air passage 36 in response to a sufficiently high vacuum pressure in the air passage 36. When the internal combustion engine is rapidly accelerated, even if the throttle valve lever 41 is rapidly turned to fully open the throttle valve 48, opening or movement of the movable plate 120 to its second position is resisted by the force of the spring 126 so that it opens later than the check valve 39.

Accordingly, the movable plate 120 as an air control opens later by a phase difference than the stepped throttle valve 48. When the stepped throttle valve 48 is in a position less than or closer to idle than a medium opening between idle and wide open, the movable plate 120 is rarely operated, and the movable plate 120 opens against the force of the spring 126 in the vicinity of the wide open position of the throttle valve 48.

While in the above-described embodiment, a rotary throttle valve comprising an integral configuration of an air valve (throttle hole 45) and a fuel mixture valve (throttle hole 55) is provided on the carburetor body, it is noted that the present invention is not limited to the carburetor of this type, and can be applied to other types of carburetors.

Third Embodiment

In a third embodiment of the invention, as shown in FIGS. 8-9, the air control is an air passage 36' of the insulator plate B" which is made longer than the mixture passage 40 to control air flow through passage 36' and enhance engine responsiveness at the time of rapid acceleration without sacrificing the maximum output power of the internal combustion engine. To accomplish this, a baffle plate 150 is provided midway in the air passage 36' and an air passage 36a passing upward and over the baffle plate 150 is connected to the air passage 36'. The insulator plate B" comprises a pair of left and right plates 152, 154, between which the baffle plate 150 is disposed. As shown in FIG. 9, the insulator plate B" is secured to the right side wall of the cylinder body 10 by bolts received through bolt holes 156 of the insulator plate B".

In the normal running of the internal combustion engine, when the piston 9 moves upward toward its top dead center position, the pressure in the crankcase chamber 18 decreases, and a fuel and air mixture flows into the crankcase chamber 18 via the mixture passages 50 and 40, the check valve 39 and the intake port 17. Air flows into the crankcase chamber 18 via the air passages 46, 36' and 36a, the check valve 14 and the scavenging passage 7. That is, a condition occurs wherein the scavenging passage 7 is filled with air, and a fuel and air mixture in made lean by air in the crankcase chamber 18. Then, the fuel and air mixture in the combustion chamber 4 is ignited by a spark plug, the pressure in the combustion chamber 4 rapidly increases, the piston 9 is driven towards a bottom dead center position, and the pressure in the crankcase chamber 18 increases.

When the piston 9 moves down to a certain position the exhaust port 5 opens so that the combustion gas of the combustion chamber 4 flows out of the exhaust port 5 and the pressure of the combustion chamber 4 rapidly decreases. At the same time, the scavenging ports 7a are opened to the combustion chamber 4 so that first, air in the scavenging passage 7 flows into the combustion chamber 4, and then the fuel and air mixture in the crankcase chamber 18 flows into the combustion chamber 4 via the scavenging passage 7.

During acceleration of the internal combustion engine, even if the air control valve 45 and the mixture valve 55 are rapidly and fully opened, a fuel and air mixture from the carburetor C rapidly flows into the crankcase chamber 18 via the mixture passages 50, 40, the check valve 39 and the intake port 17. On the other hand, air from the air passage 46 flows into the crankcase chamber 18 later than the fuel and air mixture via the air passage 36' which is longer than the mixture passage 40 and includes air passage 36a. Therefore, the quantity or flow rate of air reaching the crankcase chamber 18 is temporarily reduced compared to an engine having an air passage and mixture passage of the same effective length. Because the flow of air to the engine is delayed or reduced, the fuel and air mixture in the crankcase chamber 18 and that delivered to the combustion chamber is somewhat rich and the accelerating characteristics of the internal combustion engine are enhanced. Desirably, only the initial airflow upon rapid acceleration of the engine is delayed. At high engine speed other than rapid acceleration, a desired flow rate of air reaches the engine to provide maximum engine power output.

In the embodiment shown in FIGS. 10 and 11, an inlet and an outlet of the air passage 36" are arranged to be concentric, and a spiral air passage 36b formed in insulator plate B'" outside of the mixture passage 40 is connected between the inlet and the outlet. Accordingly, the air passage 36" including passage 36b has an effective length greater than the fuel and air mixture passage 40. In use, an effect similar to that of the embodiments shown in FIGS. 8 and 9 is obtained with a relative delay in the flow of air to the engine upon rapid acceleration of the engine due to the greater distance the air must flow through the passages 36" and 36b. In both examples, there are no moving parts increasing reliability and simplifying the design, manufacture and assembly of the engine.

While in the above-described embodiment, a rotary throttle valve having an integral configuration of an air valve and a mixture valve is provide in the carburetor, it is noted that the present invention is not limited to throttle valves and carburetors of this type, and can be applied to other types of throttle valves and carburetors.

As described above, the present invention provides a stratified scavenging two-stroke engine in which air is introduced into a scavenging passage of an internal combustion engine, a mixture of air and fuel is introduced into a crankcase chamber of the internal combustion engine, air in the scavenging passage is guided to discharge exhaust gases of a combustion chamber when the engine is scavenged, and the fuel and air mixture is then supplied to the combustion chamber. An air control temporarily restricts or delays scavenging air flow to the combustion chamber of the engine. Therefore, when the engine is rapidly accelerated, a reduced flow rate or volume of air flows into the scavenging passage and the quantity of air reaching the crankcase chamber 18 and combustion chamber 4 is temporarily reduced compared to an engine without the air control. Accordingly, the fuel and air mixture delivered to the engine when it is rapidly accelerating is somewhat rich and the accelerating characteristics of the engine are enhanced. Thereafter, the flow rate of air is essentially not affected by the air control to improve the maximum engine power output.

What is claimed is:

1. An internal combustion engine, comprising:
    a cylinder body defining in part a combustion chamber, a crankcase chamber, a scavenging passage communicating the crankcase chamber with the combustion chamber and an intake port communicating with the crankcase chamber;
    an air passage communicating with the scavenging passage and through which air is delivered to the engine;
    a fuel and air mixture passage communicating with the intake port and through which a fuel and air mixture is delivered to the engine;
    an insulator plate carried by the cylinder body and defining at least in part the air passage and the fuel and air mixture passage;
    a carburetor defining at least in part the air passage and the fuel and air mixture passage and having a throttle valve movable between idle and wide open positions and disposed in communication with the air passage to control the flow of air therethrough;
    an air control associated with the air passage to restrict air flow through the air passage when the throttle valve is rapidly moved towards its wide open position to rapidly accelerate the engine and to permit an essentially unrestricted flow of air through the air passage when the engine is not rapidly accelerating whereby, during rapid engine acceleration a lower flow rate of air is delivered to the engine than would be delivered to the engine without any air control so that a relatively rich fuel and air mixture is available for combustion to support the rapid engine acceleration.

2. The engine of claim 1 wherein the air control is defined by an air control valve carried by the insulator plate and movable from a first position restricting air flow through the air passage to a second position permitting an increased air flow through the air passage compared to said first position in response to at least a portion of the movement of the throttle valve toward its wide open position.

3. The engine of claim 2 wherein the air control valve is yieldably biased to its first position and is moved to its second position against said bias.

4. The engine of claim 3 wherein the air control valve is connected to the throttle valve by a linkage for co-movement of the air control valve and throttle valve during at least a portion of the movement of the throttle valve between its idle and wide open positions.

5. The engine of claim 4 wherein the air control valve has a valve shaft and a valve head carried by the valve shaft for rotation between its first and second positions in the air passage with the linkage connecting the valve shaft with the throttle valve.

6. The engine of claim 5 wherein the air control valve is yieldably biased to its first position and is moved to its second position against said bias to delay opening of the air control valve during rapid acceleration of the engine.

7. The engine of claim 2 wherein the air control valve reduces the flow area of the air passage by about one-half its total flow area when the air control valve is in its first position.

8. The engine of claim 1 wherein the air control is defined by the air passage which has a longer total length than the fuel and air mixture passage so that upon rapid engine acceleration, air drawn through the air passage has a greater distance to travel to reach the engine than does a fuel and air mixture delivered to the engine through the fuel and air mixture passage.

9. The engine of claim 8 which also comprises a baffle disposed in the air passage to increase the effective length of the air passage.

10. The engine of claim 9 wherein the baffle is carried by the insulator plate.

11. The engine of claim 10 wherein the insulator plate comprises first and second plates with the baffle disposed between the first and second plates.

12. The engine of claim 8 wherein at least a portion of the air passage is spiral shaped.

13. The engine of claim 1 wherein the air control is defined by an air control valve carried by the insulator plate and movable from a first position closing at least a portion of the air passage to a second position permitting an essentially unrestricted flow of air through the air passage in response to a sufficient pressure differential across the air control valve.

14. The engine of claim 13 wherein the air control valve is yieldably biased to its first position and is moved to its second position against said bias to delay movement of the air control valve to its second position when the engine is rapidly accelerated while permitting the air control valve to move to its second position when a sufficient pressure drop exists in the air passage.

15. The engine of claim 13 which also comprises a check valve movable to an open position in response to a pressure differential above a threshold value across the valve to permit fluid flow from the air passage to the scavenging passage and preventing fluid flow from the scavenging passage to the air passage and wherein a pressure differential higher in magnitude than said threshold value is required to move the air control valve from its first position to its second position.

16. The engine of claim 15 wherein both the air control valve and the check valve are reed type valves having flexible valve plates and the valve plate of the air control valve has a greater rigidity than does the valve plate of the check valve.

17. The engine of claim 13 wherein the air control valve is a reed valve having an at least somewhat flexible valve plate.

18. The engine of claim 1 which also comprises a connecting passage communicating at one end with the air passage and at its other end with the fuel and air mixture passage, and a second valve in communication with the connecting passage and movable from a first position permitting fluid flow between the air passage and the fuel and air mixture passage and a second position at least substantially restricting such fluid flow.

19. The engine of claim 18 wherein the second valve is actuated by the air control valve such that when the air control valve is in its first position the second valve is in its first position and when the air control valve is in its second position the second valve is in its second position.

20. The engine of claim 18 wherein the connecting passage communicates with the air passage between the scavenging passage and the air control valve.

* * * * *